United States Patent [19]
Doyle

[11] Patent Number: 6,048,605
[45] Date of Patent: Apr. 11, 2000

[54] COMPOSITE SHEATHING MATERIAL HAVING HIGH MOISTURE VAPOR PERMEABILITY

[75] Inventor: Robert E. Doyle, Adrian, Mich.

[73] Assignee: K2, Inc., Adrian, Mich.

[21] Appl. No.: 09/193,516

[22] Filed: Nov. 17, 1998

[51] Int. Cl.⁷ ..................................... B32B 7/02
[52] U.S. Cl. ..................... 428/214; 428/212; 428/213; 428/423.1; 428/480; 428/195; 428/334
[58] Field of Search .................................. 428/212, 213, 428/214, 423.1, 480, 195, 334

[56] References Cited

U.S. PATENT DOCUMENTS

| | | | |
|---|---|---|---|
| 3,954,011 | 5/1976 | Manske | 73/356 |
| 5,220,760 | 6/1993 | Dimakis | 52/309.9 |
| 5,562,646 | 10/1996 | Goldman et al. | 604/368 |
| 5,709,776 | 1/1998 | Coleman et al. | 162/135 |
| 5,800,884 | 9/1998 | D'Anna et al. | 428/35.7 |
| 5,948,534 | 9/1999 | Altavilla | 428/423.7 |

*Primary Examiner*—William Krynski
*Assistant Examiner*—B. Shewareged
*Attorney, Agent, or Firm*—Donald R. Fraser

[57] ABSTRACT

A composite sheathing material comprises a first layer of paperboard having a layer of a permeable resin on a surface thereof, a core layer of paperboard, a first adhesive layer positioned intermediate and adhered to the first layer of paperboard and the core layer of paperboard, said first adhesive layer comprising a controlled distribution of thicker and thinner adhesive portions, a second layer of paperboard having a second layer of a permeable resin on a surface thereof, and a second adhesive layer positioned intermediate and adhered to the second layer of paperboard and the core layer of paperboard, said second adhesive layer comprising a controlled distribution of thicker and thinner adhesive portions.

18 Claims, No Drawings

COMPOSITE SHEATHING MATERIAL HAVING HIGH MOISTURE VAPOR PERMEABILITY

FIELD OF THE INVENTION

This invention relates generally to a composite sheathing material having a high moisture vapor permeability. More particularly, the invention is directed to a multi-layered, laminated composite sheathing material which effectively precludes the passage therethrough of liquid water while permitting a high rate of moisture vapor permeation. The inventive composite sheathing material is useful, for example, as an exterior wall component for constructing residential and commercial buildings.

BACKGROUND OF THE INVENTION

Composite sheathing materials are widely used in the building and construction industries as wall components or panels, for sheathing the walls which form the exterior surfaces of a building. Such sheathing materials may be exposed to liquid water from rain or melting snow from outside the building, and moisture vapor from inside the building. Preferred sheathing materials would prevent the passage of liquid water from the exterior to the interior of the building, while allowing the passage of moisture vapor through the sheathing material from the interior to the exterior of the building. Conventional composite sheathing materials, while preventing the passage of liquid water therethrough, only provide moisture vapor permeability values of up to about 1.5 perms. By the term "perm" as it is used herein is meant the rate of moisture transfer in units of grams/hour/square foot/inch of Hg.

It would be desirable to prepare a composite sheathing material that would substantially prevent the passage therethrough of liquid water while allowing a high rate of moisture vapor permeation.

SUMMARY OF THE INVENTION

Accordant with the present invention, there has surprisingly been discovered a composite sheathing material that is substantially impervious to liquid water but is highly permeable to moisture vapor. The composite sheathing material comprises:

a first layer of paperboard, having a first layer of a permeable resin on a surface thereof;

a core layer of paperboard;

a first adhesive layer positioned intermediate and adhered to the first layer of paperboard and the core layer of paperboard, said first adhesive layer comprising a controlled distribution of thicker and thinner adhesive portions;

a second layer of paperboard, having a second layer of permeable resin on a surface thereof; and a second adhesive layer positioned intermediate and adhered to the second layer of paperboard and the core layer of paperboard, said second adhesive layer comprising a controlled distribution of thicker and thinner adhesive portions.

The inventive composite sheathing material according to the present invention is particularly useful as a wall component for the exterior walls of a residential or commercial building.

DETAILED DESCRIPTION OF THE PREFERRED EMBODIMENT

The composite sheathing material according to the present invention comprises a core layer of paperboard, a first layer of paperboard having a first layer of a permeable resin on a surface thereof, said first layer of paperboard being adhered to the core layer of paperboard by means of a first adhesive layer therebetween, and a second layer of paperboard having a second layer of a permeable resin on a surface thereof, said second layer of paperboard being adhered to the core layer of paperboard by means of a second adhesive layer therebetween. The first and second adhesive layers each comprises a controlled distribution of thicker and thinner adhesive portions.

The first, second, and core layers of paperboard are well-known materials conventionally used to manufacture laminated materials. By the term "paperboard" as it is used herein is meant all forms of paper and paper board-like materials known as useful for manufacturing composite structures. Particularly useful paperboard materials include kraft paper and kraft liner board, which materials are made primarily from pine wood by digestion with a mixture of caustic soda, sodium sulfate, sodium carbonate, and sodium sulfide. These materials may additionally contain conventional paper adjutants such as, for example, strength increasing agents, sizing agents such as, for example, paste rosin, liquid rosin, dispersed rosin, alkyl ketene dimer, alkenyl succinic anhydride, styrene maleic anhydride, wax emulsions, and latex polymer emulsions, preservatives, fillers, clays, kaolin, talc, barium sulfate, calcium carbonate, and the like. The paperboard may vary in thickness over wide limits from about 0.003 inch to about 0.2 inch. A preferred kraft paperboard having a thickness of about 0.037 inch may be obtained from Tenneco Packaging.

The first and second layers of permeable resin may be applied to the first and second layers of paperboard, respectively, by any conventional coating technique such as, for example, by extrusion coating. These layers of permeable resin form monolithic coverings for the exposed major surfaces of the paperboard layers, and are substantially impervious to liquid water but have a molecular structure which allows the passage of moisture vapor therethrough. By the term "permeable resin layer" as it is used herein is meant that the resin layer is substantially impervious to liquid water, but is highly permeable to moisture vapor. The permeable resin layers may comprise conventionally known "breathable" (permeable) resins made from polyesters, polyurethanes, acrylic polymers, polyethers, ester-ether copolymers, and the like, as well as blends and copolymers thereof. The thicknesses of the individual permeable resin layers may vary over wide limits from about 0.0002 inch to about 0.005 inch. Preferably, the thickness of each layer is about 0.001 inch. A particularly preferred permeable resin comprises "EASTMAN 20541" copolyester, available from the Eastman Chemical Company. The first and second permeable resin layers may be the same or may be different.

The first and second adhesive layers may be prepared from polymers including, for example, polyvinyl alcohols, acrylics, thermoplastic hot melts, urea or melamine formaldehyde resins, phenolics, and the like, as well as blends and copolymers thereof. A preferred adhesive is polyvinyl alcohol. The individual average thicknesses of the first and second adhesive layers may vary over wide limits from about 0.001 inch to about 0.01 inch, and the first and second adhesive layers may be the same or different.

A critical aspect of the present invention is the fact that the first and second adhesive layers, when assembled into the finished composite sheathing material, comprise a controlled distribution of thicker and thinner adhesive portions. This is a primary structural feature that contributes to the high permeability of the finished composite sheathing material.

Thus, while liquid water is prevented from passing through the composite sheathing material due to the presence of the resin and adhesive layers, moisture vapor nevertheless is able to pass through the permeable resin layers and through the thinner portions of the first and second adhesive layers. The thinner and thicker portions of the first and second adhesive layers are formed during the composite manufacturing and assembly process, as explained hereinafter.

The various components of the composite sheathing material are assembled and laminated together by conventional means. In a preferred process, the first and second adhesive layers are applied to the appropriate surfaces of the first and second paperboard layers, respectively, which paperboard layers are then contacted and adhered to the core paperboard layer using conventional, continuous lamination techniques. The adhesive layers may be applied or "printed onto" the paperboard layers using an engraved transfer roll. Accordingly, the high points of the engraved roll deposit a thinner portion of the adhesive onto the paperboard layer while the low points of the engraved roll deposit a thicker portion of the adhesive onto the paperboard layer. Thus, adhesive is applied to the paperboard layers in a selective pattern of controlled distribution, which pattern includes a plurality of thicker and thinner portions of adhesive. As will be obvious to one ordinarily skilled in the art, the pattern and resulting ratio of thicker and thinner portions of adhesive may vary considerably, and can easily be chosen by balancing the moisture vapor permeability requirements with the need for structural integrity and water impermeability in the finished composite sheathing material. Likewise, the ratio of thicknesses of the thicker and thinner portions of adhesive may vary over wide limits from about 10 to 1 to about 5 to 4. A preferred engraved roll pattern comprises grooves at a concentration of about 30 lines per inch in the machine direction and about one line per inch in the cross-machine direction. Thus, the widths of the thinner portions of the adhesive would be far smaller than the random lengths of the wood pulp fibers in the paperboard layers, so that all surface wood pulp fibers would be at least partially contacted by the thicker portions of the adhesive, thereby assuring a 100% fiber pull.

Preferably, the composite sheathing material is manufactured using a continuous lamination process utilizing uninterrupted running webs of paperboard, and permeable resin and adhesive application methods as described hereinabove. Thereafter, the composite sheathing material may be cut to appropriately sized panels for use as exterior building wall components.

Composite sheathing materials manufactured by the processes described herein, utilizing the preferred materials and parameters, have demonstrated a water vapor permeability of 5 perms and a 12% water absorption after immersion in water for 24 hours.

From the foregoing description, one ordinarily skilled in the art can easily ascertain the essential characteristics of this invention and, without departing from its spirit or scope, can make various changes and modifications to adapt the invention to various uses and conditions.

What is claimed is:

1. A composite sheathing material, comprising:
    a first layer of paperboard, having a first layer of a permeable resin on a surface thereof;
    a core layer of paperboard;
    a first adhesive layer positioned intermediate and adhered to the first layer of paperboard and the core layer of paperboard, said first adhesive layer comprising a controlled distribution of thicker and thinner adhesive portions;
    a second layer of paperboard, having a second layer of permeable resin on a surface thereof; and
    a second adhesive layer positioned intermediate and adhered to the second layer of paperboard and the core layer of paperboard, said second adhesive layer comprising a controlled distribution of thicker and thinner adhesive portions.

2. The composite sheathing material according to claim 1, wherein the layers of paperboard comprise kraft paper.

3. The composite sheathing material according to claim 1, wherein the layers of paperboard have thicknesses ranging from about 0.003 inch to about 0.2 inch.

4. The composite sheathing material according to claim 1, wherein the layers of paperboard have thicknesses of about 0.037 inch.

5. The composite sheathing material according to claim 1, wherein the layers of permeable resin comprise polyesters, polyurethanes, acrylic polymers, polyethers, ester-ether copolymers, or blends or copolymers thereof.

6. The composite sheathing material according to claim 1, wherein the layers of permeable resin have thicknesses ranging from about 0.0002 inch to about 0.005 inch.

7. The composite sheathing material according to claim 1, wherein the layers of permeable resin have thicknesses of about 0.001 inch.

8. The composite sheathing material according to claim 1, wherein the layers of permeable resin are different.

9. The composite sheathing material according to claim 1, wherein the adhesive layers comprise a polyvinyl alcohol, acrylic, thermoplastic hot melt, urea or melamine formaldehyde resin, phenolic, or a blend or copolymer thereof.

10. The composite sheathing material according to claim 1, wherein the adhesive layers comprise a polyvinyl alcohol.

11. The composite sheathing material according to claim 1, wherein the adhesive layers have average thicknesses ranging from about 0.001 inch to about 0.01 inch.

12. The composite sheathing material according to claim 1, wherein the adhesive layers are different.

13. A composite sheathing material, comprising:
    a first layer of kraft paperboard, having a first layer of a permeable resin on a surface thereof, said first layer of kraft paperboard having a thickness ranging from about 0.003 inch to about 0.2 inch, said first layer of permeable resin comprising a polyester, polyurethane, acrylic polymer, polyether, ester-ether copolymer, or a blend or copolymer thereof, said first layer of permeable resin having a thickness ranging from about 0.0002 inch to about 0.005 inch;
    a core layer of kraft paperboard, having a thickness ranging from about 0.003 inch to about 0.2 inch;
    a first adhesive layer positioned intermediate and adhered to the first layer of paperboard and the core layer of paperboard, said first adhesive layer comprising a polyvinyl alcohol, acrylic, thermoplastic hot melt, urea or melamine formaldehyde resin, phenolic, or a blend or copolymer thereof, said first adhesive layer having an average thickness ranging from about 0.001 inch to about 0.01 inch, said first adhesive layer comprising a controlled distribution of thicker and thinner adhesive portions;
    a second layer of kraft paperboard, having a second layer of a permeable resin on a surface thereof, said second layer of kraft paperboard having a thickness ranging from about 0.003 inch to about 0.2 inch, said second layer of permeable resin comprising a polyester, polyurethane, acrylic polymer, polyether, ester-ether copolymer, or a blend or copolymer thereof, said second layer of permeable resin having a thickness ranging from about 0.0002 inch to about 0.005 inch; and
    a second adhesive layer positioned intermediate and adhered to the second layer of kraft paperboard and the core layer of kraft paperboard, said second adhesive layer comprising a polyvinyl alcohol, acrylic, thermoplastic hot melt, urea or melamine formaldehyde resin, phenolic, or a blend or copolymer thereof, said second adhesive layer having an average thickness ranging from about 0.001 inch to about 0.01 inch, said second adhesive layer comprising a controlled distribution of thicker and thinner adhesive portions.

14. The composite sheathing material according to claim 13, wherein the layers of kraft paperboard have thicknesses of about 0.037 inch.

15. The composite sheathing material according to claim 13, wherein the layers of permeable resin have thicknesses of about 0.001 inch.

16. The composite sheathing material according to claim 13, wherein the adhesive layers comprise a polyvinyl alcohol.

17. The composite sheathing material according to claim 13, wherein the adhesive layers are the same.

18. The composite sheathing material according to claim 13, wherein the adhesive layers are different.

* * * * *